US012572964B2

(12) United States Patent
Nagao

(10) Patent No.: US 12,572,964 B2
(45) Date of Patent: Mar. 10, 2026

(54) NON-TRANSITORY COMPUTER READABLE STORAGE MEDIUM AND SYSTEM PERFORMING SPECIFIC PROCESS WHICH ENABLES PAYMENT OF CHARGE OF ARTICLE

(71) Applicant: BROTHER KOGYO KABUSHIKI KAISHA, Nagoya (JP)

(72) Inventor: Satoki Nagao, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/706,233

(22) Filed: Mar. 28, 2022

(65) Prior Publication Data

US 2022/0318886 A1     Oct. 6, 2022

(30) Foreign Application Priority Data

Mar. 30, 2021    (JP) ................................. 2021-058132

(51) Int. Cl.
*G06Q 30/0601* (2023.01)
*G06F 16/955* (2019.01)

(52) U.S. Cl.
CPC ....... *G06Q 30/0601* (2013.01); *G06F 16/955* (2019.01); *G06Q 30/0611* (2013.01)

(58) Field of Classification Search
CPC ............. G06Q 30/0637; G06Q 10/083; G06Q 30/0601; G06Q 30/0611; G06F 16/955
See application file for complete search history.

(56) References Cited

U.S. PATENT DOCUMENTS

2002/0138445 A1* 9/2002 Laage .................. G06Q 20/382
                                                              705/67
2005/0074246 A1* 4/2005 Hayward ........... G06Q 30/0605
                                                              399/24
(Continued)

FOREIGN PATENT DOCUMENTS

JP        2017058725 A     3/2017
JP        2017224104 A     12/2017
(Continued)

OTHER PUBLICATIONS

Solano A, Dormido R, Duro N, González V. One-Time URL: A Proximity Security Mechanism between Internet of Things and Mobile Devices. Sensors (Basel). Oct. 13, 2016;16(10):1694. doi: 10.3390/s16101694. PMID: 27754378; PMCID: PMC5087482. (Year: 2016).*

(Continued)

*Primary Examiner* — Jeffrey A. Smith
*Assistant Examiner* — Latasha D Ramphal
(74) *Attorney, Agent, or Firm* — Kenealy Vaidya LLP

(57) ABSTRACT

A management device receives designation information from an information processing device. The designation information designates an article to be purchased and a shipping destination of the article. The device performs a specific process to cause generation of a URL which is a Uniform Resource Locator to be used for starting-up an application software to settle a payment of charge of the article designated by the designation information. The controller receives purchase completion information indicating that the payment is completed in a case that: the specific process is completed; the information processing device transmits the URL to an external device; the application software is started up by the URI, on the external device; and the payment is completed by using the application software on the external device. The device transmits a shipping (Continued)

command to ship the article to the shipping destination in response to receiving the purchase completion information.

12 Claims, 7 Drawing Sheets

(56)                    References Cited

U.S. PATENT DOCUMENTS

| | | | |
|---|---|---|---|
| 2012/0059758 A1* | 3/2012 | Carlson | G06Q 20/10 |
| | | | 705/39 |
| 2016/0132846 A1* | 5/2016 | Liu | G06Q 20/12 |
| | | | 705/39 |
| 2018/0272733 A1 | 9/2018 | Moriya | |
| 2019/0034921 A1* | 1/2019 | Hammad | G06Q 20/384 |
| 2019/0098030 A1* | 3/2019 | Aabye | H04W 12/128 |
| 2021/0035194 A1 | 2/2021 | Nakaishi | |
| 2022/0164786 A1* | 5/2022 | Gangam | G06Q 20/342 |

FOREIGN PATENT DOCUMENTS

| | | |
|---|---|---|
| JP | 2018-163384 A | 10/2018 |
| JP | 2021022238 A | 2/2021 |

OTHER PUBLICATIONS

Japanese Office Action for the related Japanese Patent Application No. 2021-058132 dated Nov. 26, 2024.

* cited by examiner

NON-TRANSITORY COMPUTER READABLE STORAGE MEDIUM AND SYSTEM PERFORMING SPECIFIC PROCESS WHICH ENABLES PAYMENT OF CHARGE OF ARTICLE

CROSS REFERENCE TO RELATED APPLICATION

This application claims priority from Japanese Patent Application No. 2021-058132 filed Mar. 30, 2021. The entire content of the priority application is incorporated herein by reference.

BACKGROUND

Conventionally, a multifunction peripheral (MFP) has been capable of requesting an administrator to purchase consumables used for printing or reading of images, such as toner, photosensitive drum units, and recording sheets.

This type of MFP selectively displays one of a Purchase Consumables button and a Notify Administrator button according to the authority of the user currently logged in to the MFP. The Purchase Consumables button accepts an instruction for purchasing a consumable, The Notify Administrator button accepts an instruction to request an administrator to purchase a consumable. When the Notify Administrator button is selected, the MFP sends an e-mail message to the administrator with a request to purchase a consumable.

SUMMARY

With the MFP having the above configuration, the administrator orders a consumable upon receiving the e-mail from the MFP requesting that the consumable be purchased. When ordering a consumable, the administrator must know such information as the shipping destination for the consumable being purchased.

Consequently, the user who has logged in to the MFP and requested the purchase (hereinafter the "purchase client") must provide such information as the shipping destination to the administrator. Additionally, the administrator that receives this request from the MFP (that is, the person actually purchasing the consumable; hereinafter the "purchaser") must contact the supplier again to relay information about the shipping destination. Hence, the conventional device creates unnecessary work for the purchase client and the purchaser.

In view of the foregoing, it is an object of the present disclosure to improve convenience for users by reducing the time and effort required by users such as purchase clients and purchasers when one person requests another to purchase an article and the requested person purchases the article.

In order to attain the above and other objects, the disclosure provides a non-transitory computer readable storage medium storing a set of program instructions installed on and executed by a computer provided in a management device. The set of program instructions includes: receiving designation information from an information processing device, the designation information designating an article to be purchased and a shipping destination of the article; performing a specific process to cause generation of a URL which is a Uniform Resource Locator to be used for starting-up an application software to settle a payment of charge of the article designated by the designation information; receiving purchase completion information indicating that the payment is completed in a case that: the specific process is completed; the information processing device transmits the URL to an external device; the application software is started up by the URL on the external device; and the payment is completed by using the application software on the external device; and transmitting a shipping command to ship the article to the shipping destination in response to receiving the purchase completion information. Accordingly, when the purchase client using the information processing device requests the purchaser using the external device to purchase the articles, the purchaser can purchase the articles to arrange for delivery of the articles without knowing information on the shipping destination. Hence, there is no need for the purchase client to communicate the shipping destination to the purchaser nor for the purchaser to communicate the shipping destination to the supplier. Accordingly, this configuration reduces the time and effort required for users such as the purchase client or the purchaser, enhancing convenience for these users.

According to another aspect, the disclosure provides a system. The system includes a receiving component, a generation component, a receiving component, and a transmitting component. The receiving component is configured to receive designation information from an information processing device. The designation information designates an article to be purchased and a shipping destination of the article. The generation component is configured to generate a URL which is a Uniform Resource Locator to be used for starting-up an application software to settle a payment of charge of the article designated by the designation information. The receiving component is configured to receive a purchase completion information indicating that the payment is completed in a case that: the information processing device transmits the URL to an external device; the application software is started up by the URL on the external device; and the payment is completed by using the application software on the external device. The transmitting component is configured to transmit a shipping command to ship the article to the shipping destination in response to receiving the purchase completion information. Accordingly, the same effects as the configuration of the non-transitory computer readable storage medium can be made.

BRIEF DESCRIPTION OF THE DRAWINGS

The particular features and advantages of the disclosure as well as other objects will become apparent from the following description taken in connection with the accompanying drawings, in which:

FIG. 3 is a sequence diagram illustrating a continuation part of the process shown in FIG. 2;

FIG. 7 is a sequence diagram illustrating a continuation part of the process shown in FIG. 6.

DETAILED DESCRIPTION

Embodiments of the disclosure will be described while referring to accompanied drawings.

1. First Embodiment

1-1. System Configuration

Figure 1:
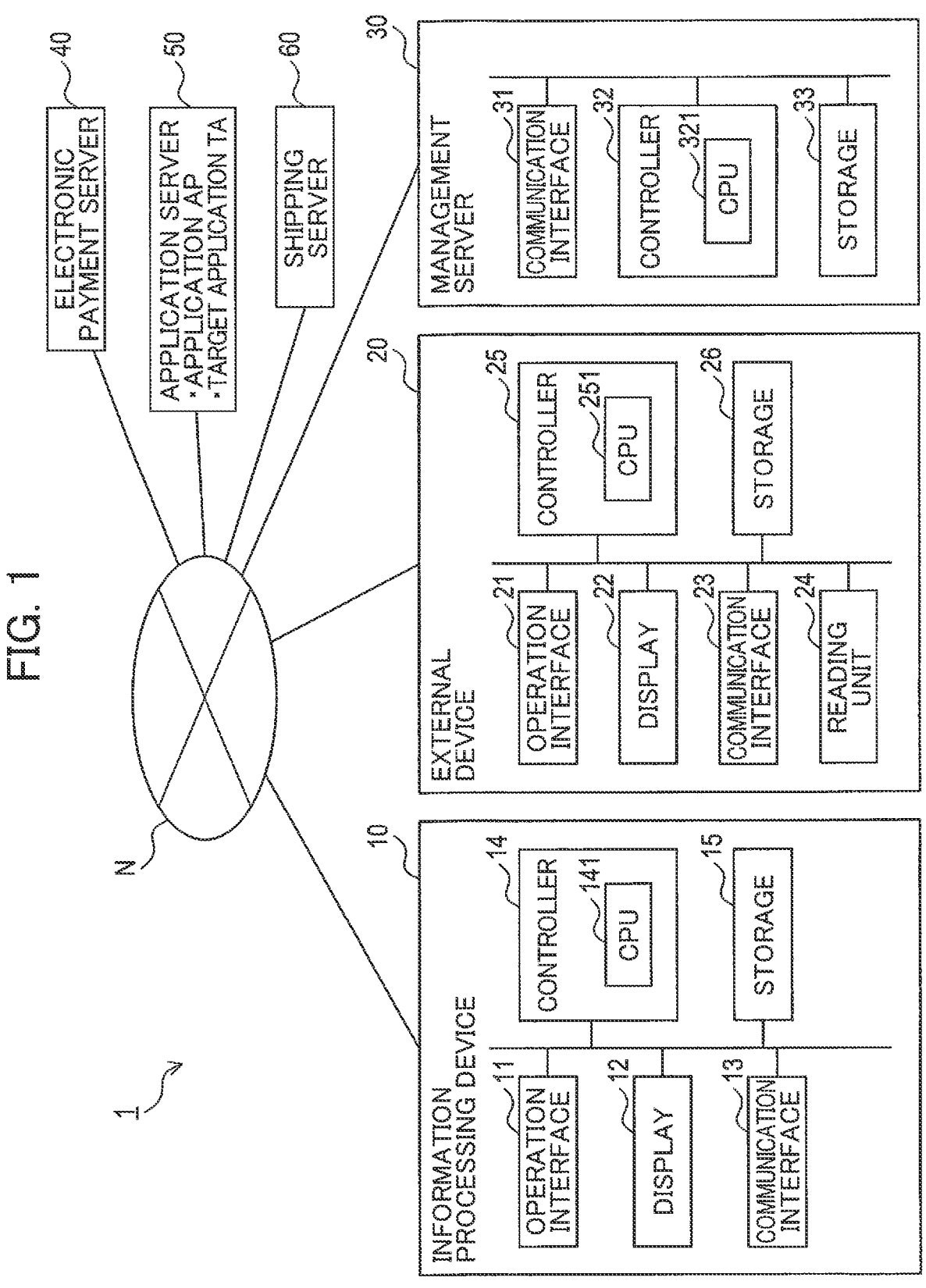
FIG. 1 is a block diagram illustrating a configuration of a system according to an embodiment.

FIG. 1 shows a system 1 enabling a user to request another person to purchase articles (products) and to settle payment for the articles being purchased. In the present embodiment, the article being purchased is envisioned to be a consumable used in a printer, such as toner, photosensitive drum units, and recording sheets. The system 1 is provided with an information processing device 10, an external device 20, a management server 30, an electronic payment server 40, an application server 50, and a shipping server 60.

Information Processing Device

The information processing device 10 is used by a purchase client, i.e., the user requesting the purchase of articles. The information processing device 10 may be a portable information terminal such as a smartphone, a tablet computer, a mobile computer, and a cell phone, as well as a printer, a desktop computer, or the like. The information processing device 10 is provided with an operation interface 11, a display 12, a communication interface 13, a controller 14, and a storage 15.

The operation interface 11 has a plurality of keys. By operating the operation interface 11, the user can input various instructions into the information processing device 10. The display 12 is a display for displaying various information. The display 12 may also have the function of a touchscreen. In other words, the display 12 also functions as an operation interface that the user can operate. In the following description, the operation interface 11 and the operation interface implemented by the display 12 will be collectively referred to as the "operation interface 11."

The communication interface 13 is a network interface for connecting the information processing device 10 to a network N for data communication. The network N may be any of various networks such as the Internet, a wireless LAN, or a wired LAN.

The controller 14 has a CPU 141, for example. The storage 15 has semiconductor memory such as ROM, RAM, NVRAM, flash memory, and SSD. That is, the information processing device 10 is provided with a microcomputer that includes the CPU 141 and semiconductor memory. The storage 15 may also be provided with memory other than semiconductor memory, such as a hard disk drive.

The CPU 141 executes a program stored in a non-transitory, tangible storage medium to implement the various functions of the controller 14. In this example, the storage 15 corresponds to the non-transitory, tangible storage medium that stores the program. By executing this program, the CPU 141 executes a method corresponding to the program. The controller 14 may be configured of one or a plurality of microcomputers. The storage 15 stores various software, including an operating system (OS), and various data.

External Device

The external device 20 is a device provided externally to the information processing device 10. The external device

20 is used by the purchaser who actually purchases articles when receiving a request to purchase the articles from a purchase client. The external device 20 may be a portable information terminal such as a smartphone, a tablet computer, a mobile computer, a cell phone, as well as another information processing device. The external device 20 is provided with an operation interface 21, a display 22, a communication interface 23, a reading unit 24, a controller 25, and a storage 26.

The operation interface 21 is provided with a plurality of keys. By operating the operation interface 21, the user can input various instructions into the external device 20. The display 22 is for displaying various information. The display 22 also functions as a touchscreen. In other words, the display 22 may function as an operation interface that the user operates. In the following description, the operation interface 21 and the operation interface implemented by the display 22 will collectively be referred to as the "operation interface 21."

The communication interface 23 is a network interface for connecting the information processing device 20 to the network N for data communication. The reading unit 24 is provided with a camera and reads code information, such as a QR code or the like, from an image captured by the camera. Code information is information that has been encoded. "QR code" is a registered Japanese trademark of DENSO WAVE INCORPORATED.

The controller 25 has a CPU 251, for example. The storage 26 has semiconductor memory such as ROM, RAM, NVRAM, flash memory, and SSD. In other words, the external device 20 is provided with a microcomputer that includes the CPU 251 and semiconductor memory. The storage 26 may be provided with memory other than semiconductor memory, such as a hard disk drive.

The CPU 251 executes a program stored in a non-transitory, tangible storage medium to implement the various functions of the controller 25. In this example, the storage 26 corresponds to the non-transitory, tangible storage medium that stores the program. By executing the program, the CPU 251 also executes a method corresponding to the program. Note that the controller 25 may be configured of one or a plurality of microcomputers.

The storage 26 stores various software, including an OS, and various data. In the present embodiment, the OS stored in the storage 26 is envisioned to be iOS (registered trademark) developed by Apple Inc. The storage 26 also stores a downloaded application for electronic payments. Such payment applications include Apple Pay (registered trademark), for example. In order to use a payment application, the user must register in advance information required for payment, including a credit card number and billing address information.

Management Server

The management server 30 is installed on the network N by an administrator or a company providing a purchase requesting service. With the purchase requesting service, a user can issue a. request to another person through a prescribed application to purchase articles, and the purchaser receiving the request can pay for the articles using an application. Once payment is settled, the management server 30 transmits an instruction to a supplier (or a shipping company) to ship the articles. The management server 30 provides this purchase requesting service through collaboration with the electronic payment server 40, the application server 50, and the shipping server 60.

The management server 30 is provided with a communication interface 31, a controller 32, and a storage 33. The communication interface 31 is a network interface fur connecting the management server 30 to the network N.

The controller 32 has a CPU 321, for example. The storage 33 has semiconductor memory such as ROM, RAM, NVRAM, flash memory, and SSD. In other words, the management server 30 is provided with a microcomputer that includes the CPU 321 and semiconductor memory. The storage 33 may be provided with memory other than semiconductor memory, such as a hard disk drive.

By executing a program stored in a non-transitory, tangible storage medium, the CPU 321 implements the various functions of the controller 32. In this example, the storage 33 corresponds to the non-transitory, tangible storage medium that stores the program. By executing this program, the CPU 321 also executes a method corresponding to the program. Note that the controller 32 may be configured with one or a plurality of microcomputers.

To use the purchase requesting service in the present embodiment, the user registers user information and creates an account. The user information in this description includes the user's name, a user ID, a password, a shipping destination, and other information. The information on the shipping destination is a user-specified address or the like to which articles are to be delivered, for example. This user information is stored in the storage 33.

Electronic Payment Server

The electronic payment server 40 is a server that facilitates electronic payments. A company offering the electronic payment service (Apple Inc., for example) provides the electronic payment server 40 on the network N. In the present embodiment, users utilize the electronic payment service provided by the electronic payment server 40 to pay charges incurred when purchasing articles.

Application Server

A company providing a service for downloading applications (Apple Inc., for example) provides the application. server 50 on the network N. The application server 50 transmits an application specified by the user to an information processing device such as the information processing device 10 or the external device 20.

In the present embodiment, an application AP and a target application TA have been uploaded to the application. server 50. The application AP and the target application TA are provided to users by the company that owns the management server 30.

The application AP provides a function for requesting another party to purchase articles, and a function for paying the cost of the articles. The application AP may be envisioned to be used by both the purchase client of the articles and the purchaser of the articles.

The target application TA provides some functions (parts of functions) of the application AP, and specifically the function for paying the cost of articles. In the present embodiment, the target application TA is an App Clip of the application AR App Clips will be described briefly here.

App Clips are a function that was introduced in iOS 14. An App Clip provides some functions (partial functions) of an application at a time and place required by the user without requiring the user to download the (full) application. In other words, an App Clip for a certain application is a mini-application created by extracting a portion of the functionality of that application. An App Clip is a relatively low-volume application (no greater than 10 MB, for example). Accordingly, a user can quickly download an App Clip when required to utilize some functions of the full application. (the regular complete application) without having to download the full application.

The target application TA (the App Clip) provides some functions of the application AP, and specifically the function for settling the payment of charges for consumables. The target application TA is used by a purchaser for purchasing articles when requested by a purchase client.

Note that the application AP constituting the complete application may require installation (or setup), while the target application TA may not require installation. Here, an "application requiring installation" may denote an application that once installed in hardware remains in hardware and continues to be available to the user as long as the user does not intentionally remove (uninstall) the application. Conversely, an "application not requiring installation" may denote an application that is automatically removed from hardware once a prescribed time has elapsed after the application was used or introduced in hardware, without requiring the user to uninstall the application.

The application AP and the target. application TA are uploaded to the application server 50 in advance.

Shipping Server

The shipping server 60 is provided on the network N by the supplier (or the shipping company). The shipping server 60 receives instructions from the management server 30 to ship purchased articles.

1-2. Process

Next, a process executed by the devices 10-60 of the system 1 will be described with reference to the sequence chart in FIGS. 2 and 3. For simplification, the process executed by the controller 14 of the information processing device 10 according to the program is described with the information processing device 10 serving as the subject of execution rather than the controller 14. Further, since all communication executed by the information processing device 10 is conducted via the communication interface 13, references to "through the communication interface 13" have been omitted when describing communications. Similarly, the external device 20 and the management server 30 are referred to as the subjects of process execution, and references to "through the communication interface 23" and "through the communication interface 31" have been omitted. Similarly, when describing processes performed by the application AP among processes performed on the information processing device 10, the subject of the process will be referred to as the application AP, as in "the application AP on the information processing device 10." Similarly, when describing processes performed by the target application TA among processes performed on the external device 20, the subject of the process will be referred to as the target application TA, as in "the target application TA on the external device 20."

Figure 2:
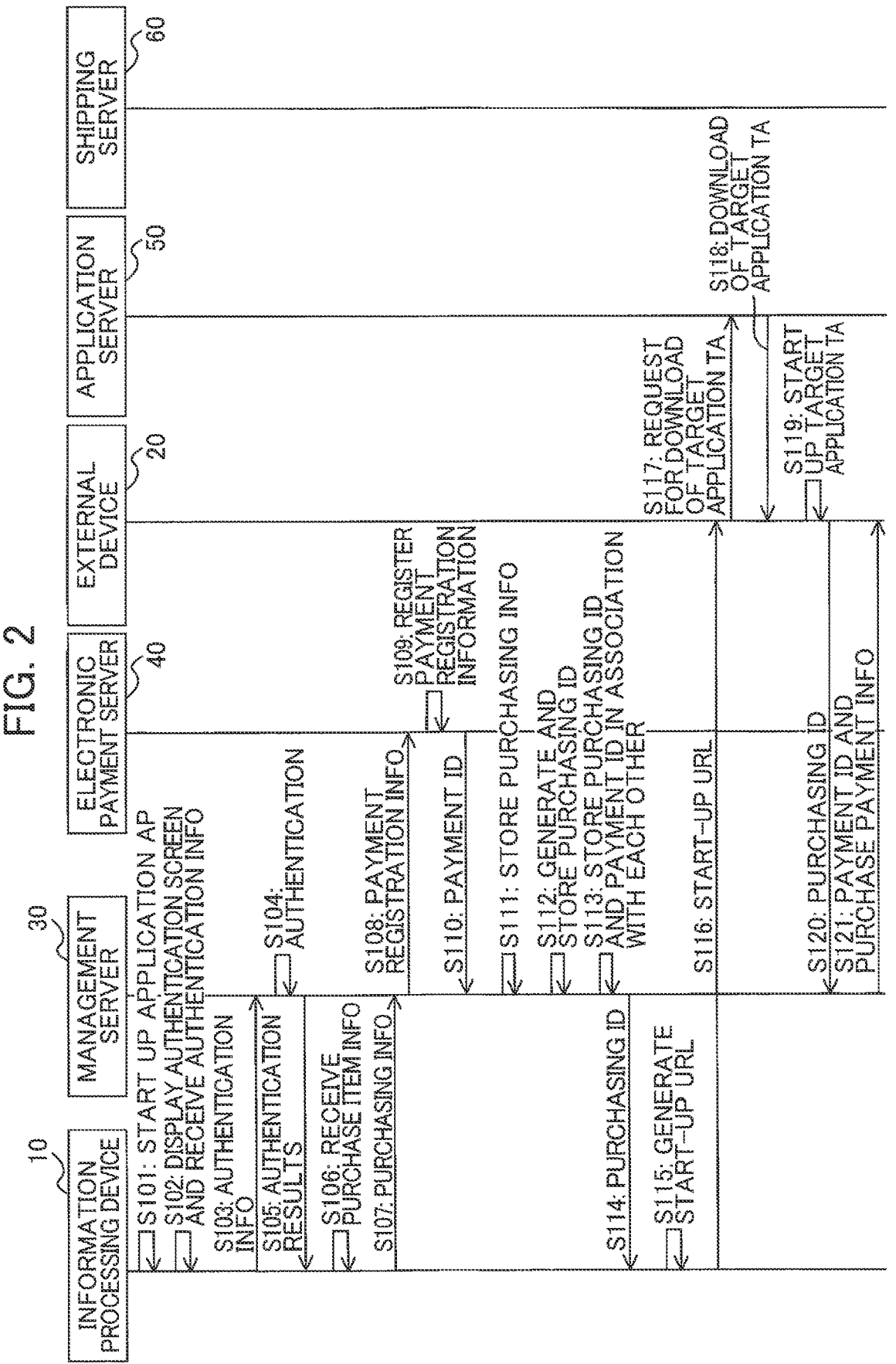
FIG. 2 is a sequence diagram illustrating a part of a process performed by the system.

In S101 at the beginning of the process in FIG. 2, the purchase client starts up the application AP on the information processing device 10. In S102 the application AP on the information processing device 10 displays an authentication screen (not shown) on the display 12 and receives authentication information inputted by the purchase client through the operation interface 11. This authentication screen is displayed for performing user authentication. The authentication information is information for authenticating the user, such as a user ID and a password.

In S103 the information processing device 10 transmits the inputted authentication information to the management server 30. In S104 the management server 30 performs user authentication based on the authentication information received from the information processing device 10. Specifically, the management server 30 determines whether the received authentication information matches information included in authentication information (user ID, password, etc., for example) provided in the user information stored in the storage 33. The management server 30 determines that authentication was successful when the information matches, and that authentication failed when the information does not match.

In S105 the management server 30 transmits the authentication results to the information processing device 10. The process in S106 and subsequent steps is performed only when the authentication results indicate successful authentication. The example shown in FIGS. 2 and 3 assumes that the authentication results indicate successful authentication.

In S106 the application AP on the information processing device 10 receives purchase item information inputted by the purchase client through the operation interface 11 for one or plurality of items (articles) being purchased. Here, the purchase item information identifies each article that the purchase client wishes to purchase. For example, the purchase item information may include the name, the model number, a quantity, and the like of each article being purchased (e.g., a consumable for a printer, such as toner).

Here, the application AP on the information processing device 10 may also receive a message for the purchase inputted by the purchase client together with the purchase item information, such as "The matter approved in yesterday's meeting."

In S107 the application AP on the information processing device 10 transmits purchasing information to the management server 30. The purchasing information in this description specifies the article(s) being purchased and the shipping destination for the article(s). In the present embodiment, the purchasing information includes the purchase item information inputted in S106 and client account information specifying the client account from which the request originated, and including information of an address of the client account which is used as the shipping destination of the articles. The client account is the user account of the purchase client used for the purchase requesting service. Hence, the client account information corresponds to information specifying the shipping destination.

When a message is inputted together with the purchase item information in S106, information representing that message is included in the purchasing information. In response to receiving the purchasing information from the information processing device 10, in S108 the management server 30 transmits payment registration information to the electronic payment server 40. The payment registration information is based on the purchasing information.

The payment registration information is used when making an electronic payment on the electronic payment server 40 for charges incurred for the articles being purchased. Specifically, to make an electronic payment on the electronic payment server 40, the objects of purchase inputted by the purchase client must be registered on the electronic payment server 40 as electronic items. In the present embodiment, the payment registration information constitutes information for electrically registering the objects (articles) of the purchase as one set (or group) of electronic items. The set of electronic items indicates a commercial transaction in which the payment therefor is performed on the electronic payment server 40. Each electronic item indicates one of the articles included in the purchasing information. Specifically, the payment registration information includes information specifying the name of each electronic item, the total cost of all the set of electronic items, and the like.

In S109 the electronic payment server 40 uses the payment registration information received in S108 to register the articles being purchased in a storage thereof (not shown) as the set of electronic items. In S108, the electronic payment server 40 also registers the total cost of the set of electronic items. In S110 the electronic payment server 40 transmits a payment ID to the management server 30. The payment ID in this description is identification information used by the electronic payment server 40 and is assigned to each electronic payment made on the electronic payment server 40. The payment ID transmitted in S110 relates to the (electronic) payment of the articles registered as the set of electronic items according to the payment registration information received in S108. The payment ID is stored in the storage of the electronic payment server 40 in association with the set of all electronic items registered in S109.

In S111 the management server 30 stores the purchasing information received in S107 in the storage 33. In S112 the management server 30 generates a purchasing ID and records this purchasing ID in the storage 33.

The purchasing ID is information uniquely identifying the purchase of article(s) specified by the purchasing information received in S107. The purchasing ID is stored in the storage 33 in association with the purchasing information. (i.e., the purchase item information, the client account information, the message received from the purchase client for the purchaser, and the like).

In S113 the management server 30 stores the purchasing ID generated in. S112 in the storage 33 and the payment ID received from the electronic payment server 40 in S110 so that the purchasing ID and the payment ID are in association with each other. In S114 the management server 30 transmits the purchasing ID to the information processing device 10.

In response to receiving the purchasing ID from the management server 30, in S115 the application AP on the information processing device 10 generates a start-up URL (Uniform Resource Locator). The start-up URL in this specification is used for starting up the target application TA. As will be described later, the target application TA is downloaded and started up by accessing the application server 50 using the start-up URL. In the present embodiment, the URL includes the purchasing ID received from the management server 30 in S114 as a URL query parameter.

In S116 the information processing device 10 sends the start-up URI, generated in S115 to the external device 20. While there is no particular restriction on the method of sending the start-up URL from the information processing device 10 to the external device 20, the start-up URL may be sent according to the following method. That is, the information processing device 10 may display a QR code that includes the start-up URL on the display 12. Subsequently, the external device 20 may read the QR code displayed on the display 12 using the reading unit 24 so that the start-up URL is transmitted from the information processing device 10 to the external device 20. Alternatively, the start-up URL may he sent to the external device 20 through an e-mail application or an application such as LINE or another type of social networking service (SNS), for example. "LINE" is a registered Japanese trademark of LINE corporation.

In S117 the external device 20 accesses the application server 50 using the start-up URL acquired from the information processing device 10 and issues a request to the application server 50 for download of the target application TA. In S118 the external device 20 downloads the target application TA from the application server 50. After downloading the target application TA, in S119 the external device 20 starts up the target application TA. When the target application TA is started up using the start-up URL, the purchasing ID is automatically inputted into the target application TA according to the URL query parameter included in the start-up URL.

In S120 the target application TA on the external device 20 transmits the purchasing ID included in the start-up URL acquired from. the information processing device 10 to the management server 30. In S121 the management server 30 acquires from the storage 33 the payment ID and the purchasing information that are associated with the purchasing ID received from the external device 20, and generates purchase payment information based on the acquired purchasing information. Subsequently, the management server 30 transmits the payment ID and the generated purchase payment information to the external device 20.

Here, the purchase payment information is used when displaying a purchase confirmation screen B1 and a payment confirmation screen B2 described later on the display 22. As a specific example, the purchase payment information includes information on the articles being purchased, information on the client account, and the like. The information on the articles being purchased may include the name, model number, quantity of each article, the total cost of all the articles, and the like. The information on the client account may include the client account name, the shipping destination for the articles, contact information for the purchase client, and the like.

Figure 3:
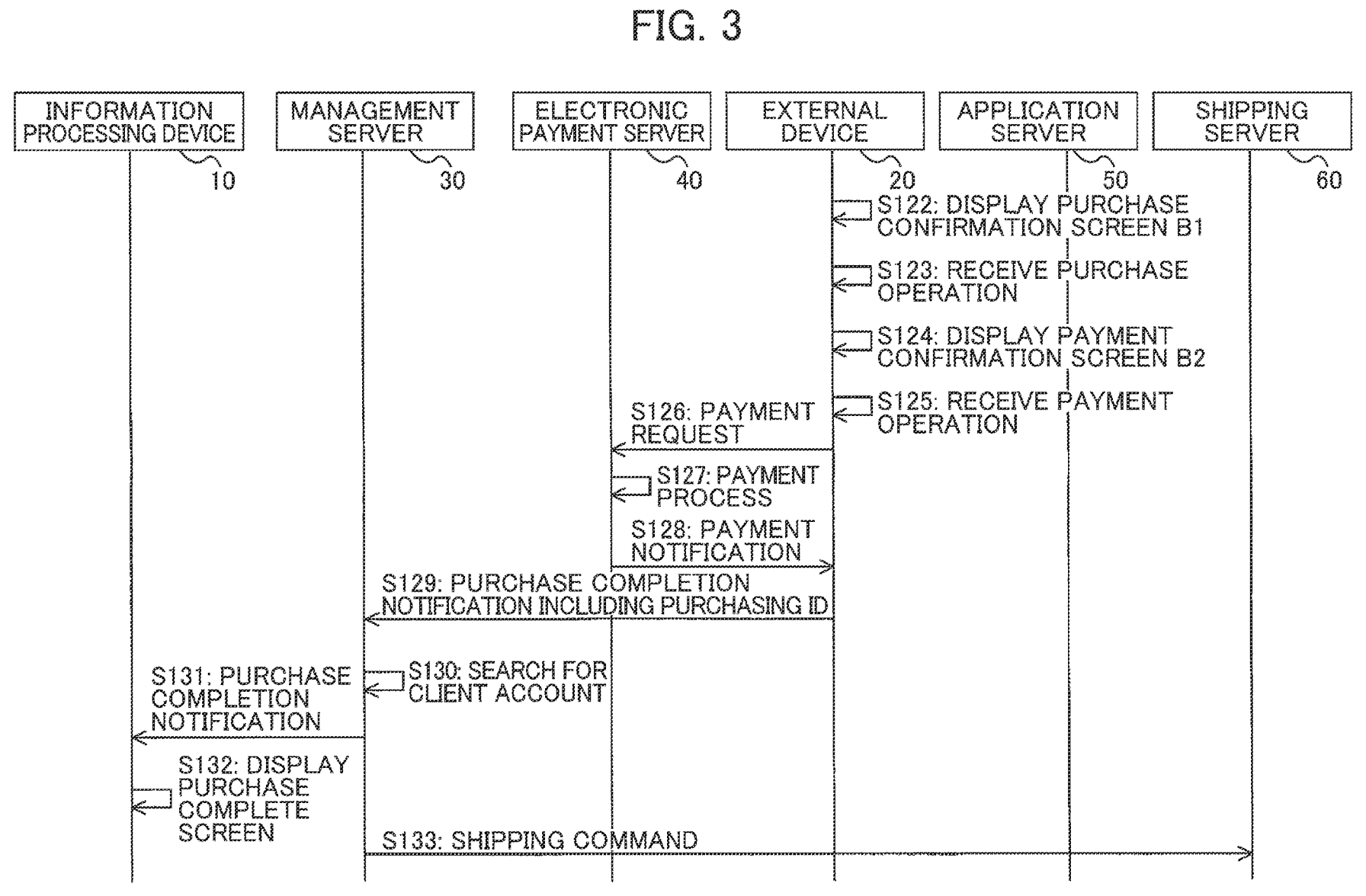
Figure 4:
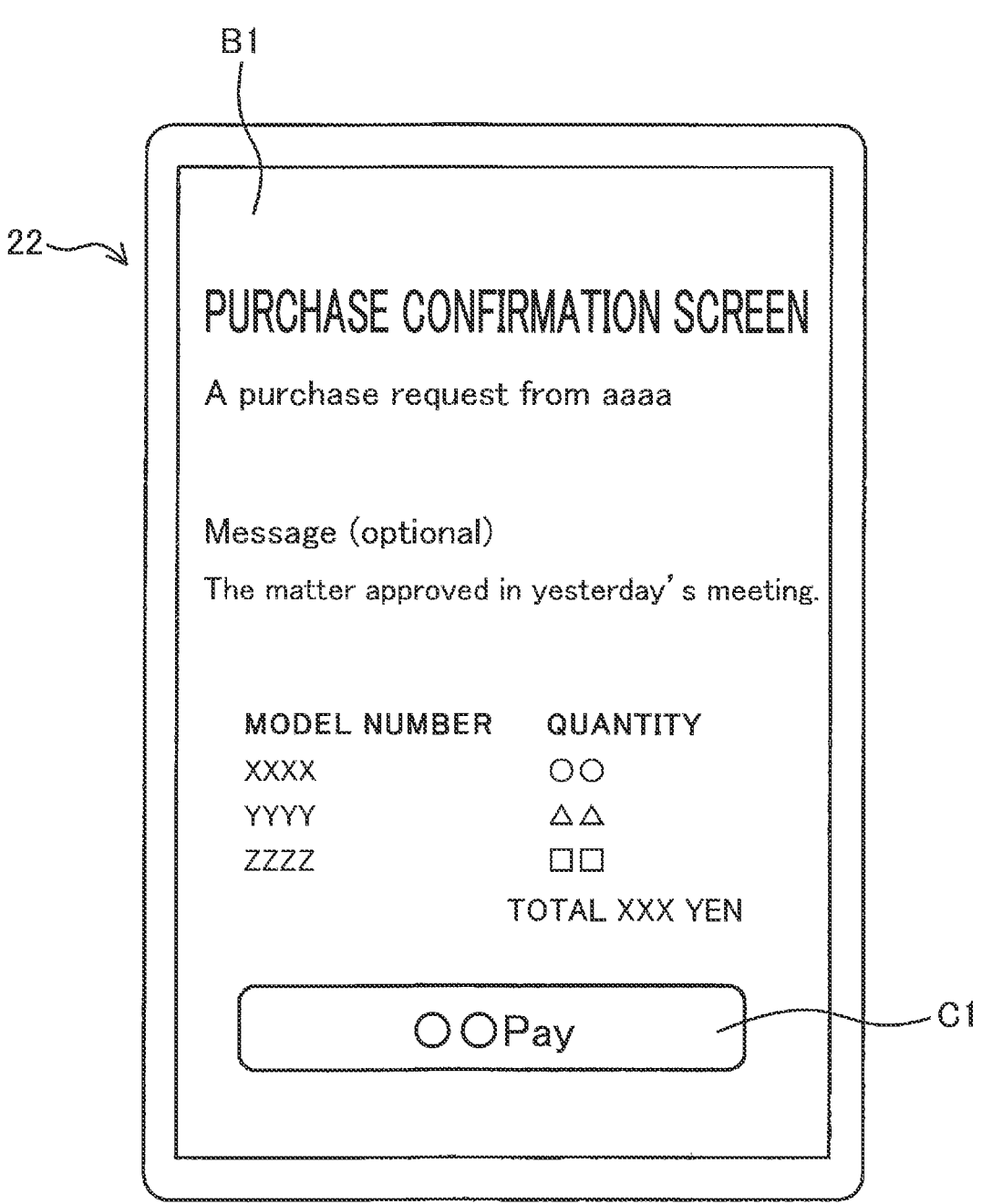
FIG. 4 is an explanatory diagram illustrating a purchase confirmation screen.

In S122 of FIG. 3, the target application TA on the external device 20 displays the purchase confirmation screen B1 shown in FIG. 4 on the display 22 using the purchase payment information received in S121. The purchase confirmation screen B1 is a screen through which the purchaser verifies details of the purchase. A message indicating the purchase client, such as "A purchase request from aaaa," is displayed in the purchase confirmation screen B1. Here, "aaaa" is the client account name. The purchase confirmation screen 31 may also display a message for the purchaser from the purchase client; the name, model number, quantity of each article, the total cost of all the articles being purchased, and the like, A Pay button C1 is also displayed in the purchase confirmation screen B1. The Pay button C1 enables the purchaser to pay the cost of the articles using the payment application.

In S123 the target application TA on the external device 20 receives a purchase operation from the purchaser via the operation interface 21. The purchase operation is an operation for pressing the Pay button C1.

Figure 5:
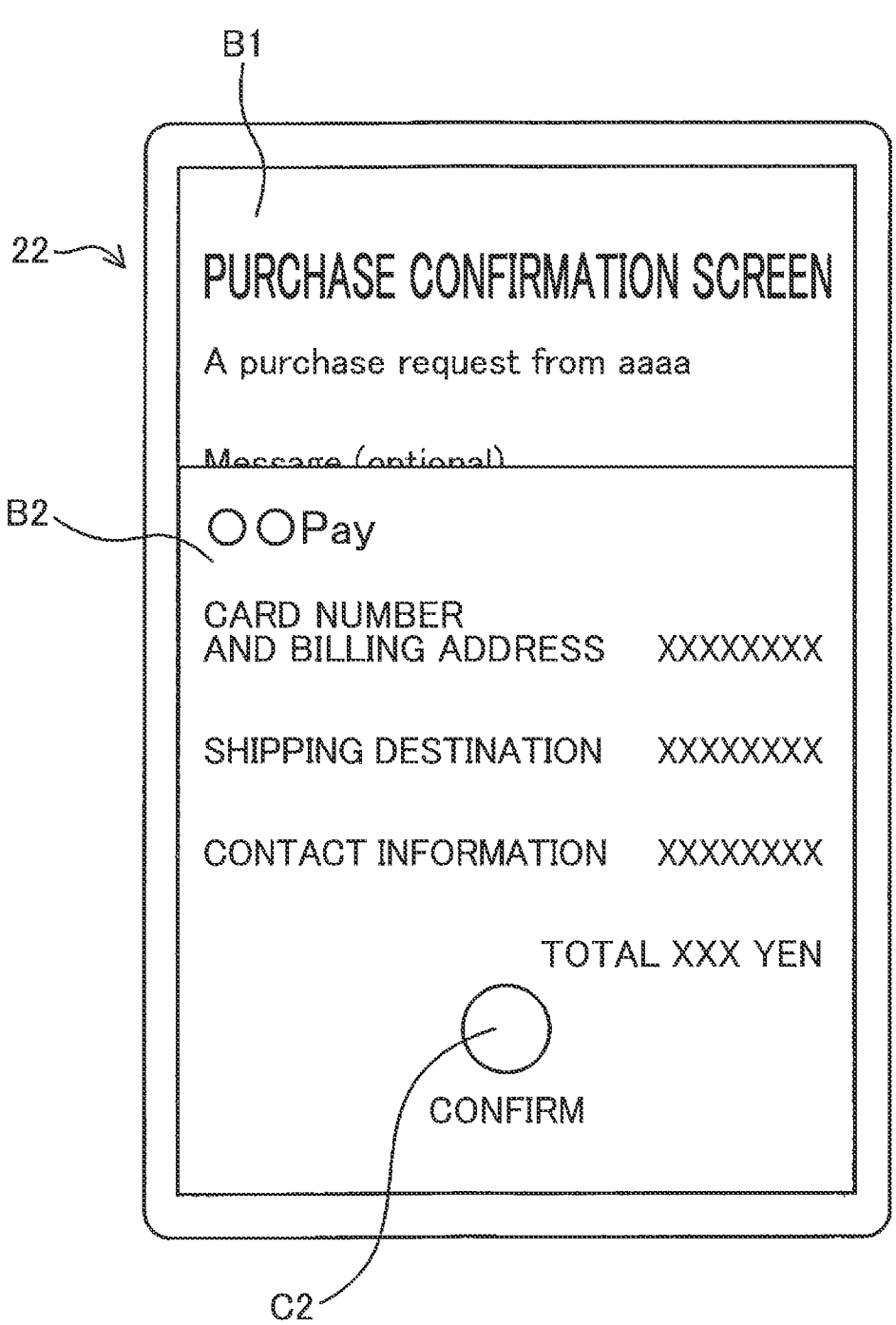
FIG. 5 is an explanatory diagram illustrating a payment confirmation screen.

In response to receiving the purchase operation, in S124 the target application TA on the external device 20 displays the payment confirmation screen B2 shown in FIG. 5 on the display 22. The payment confirmation screen B2 is a screen enabling the purchaser to confirm the details of payment. The payment confirmation screen B2 displays the name of the payment application used for payment ("○○ Pay," for example); the card number and billing address of the credit card used by the purchaser; the shipping destination for the articles; contact information for the purchase client; the total cost; and a Confirm button C2 for concluding payment. Of this information, information on the name of the payment application, the card number, and the billing address have been registered by the purchaser in the payment application "○○ Pay" used by the purchaser. On the other hand, the shipping address for the articles and contact information for the purchase client is included in the purchase payment information received in S121.

In S125 the target application TA on the external device 20 receives a payment operation from the purchaser. The payment operation is an operation for pressing the Confirm button C2. In response to receiving the payment operation, in S126 the target application TA on the external device 20 transmits a payment request to the electronic payment server 40 requesting that payment be made, The payment request includes the total cost of the articles being purchased, the credit card number, the billing address, and other information. The payment request may also include information enabling the electronic payment server 40 to identify the set of electronic items. In the present embodiment, information enabling the electronic payment server 40 to identify the set of electronic items is the payment ID received from the management server 30 in S121. That is, the payment request includes the payment ID.

In response to receiving the payment request from the external device 20, in S127 the electronic payment server 40 executes a payment process. Specifically, the electronic payment server 40 identifies the corresponding set of electronic items in the storage of the electronic payment server 40 using the payment ID received in S126. Next, the electronic payment server 40 performs a payment process for the cost of the set of electronic items. By executing the payment process, the electronic payment server 40 charges the purchaser the total sum (cost) of the set of electronic items and payment is concluded for the charged sum.

In S128 the electronic payment server 40 transmits a payment notification to the external device 20 indicating that payment was concluded. The payment notification may include the payment ID. In response to receiving the payment notification, in S129 the target application TA on the external device 20 transmits a purchase completion notification to the management server 30. The purchase completion notification indicates that purchase of the articles was completed (i.e., payment was settled). The purchase completion notification includes the purchasing ID that was included in the start-up URL which the external device 20 acquired from the information processing device 10 in S116.

After receiving the purchase completion notification from the external device 20, in S130 the management server 30 searches for and retrieves the client account information and the purchase item information which are associated with the purchasing ID included in the purchase completion notification from information stored in the storage 33.

In S131 the management server 30 transmits a purchase completion notification to the information processing device 10 used by the user of the client account (i.e., the purchase client) included in the client account information retrieved in S130. The purchase completion notification may include the purchasing ID.

In S132 the OS or the target application. TA on the information processing device 10 displays a purchase complete screen (not shown) on the display 12 indicating that the purchase was completed. For example, the OS may execute a process to display a purchase completion notification on the display 12 through a push notification, or the target application TA may execute a process to display the purchase completion notification on the display 12. The purchase client verifies that the articles were purchased by viewing the purchase complete screen.

In S133 the management server 30 transmits a shipping command to the shipping server 60. The shipping command includes information necessary for shipping the articles. As a specific example, the shipping command is based on the client account information and the purchase item information retrieved in S130 may include the name, model number, and quantity of each article being shipped; and the name, address, and the like for the shipping destination. The shipping command is for commanding to ship the articles to the address of the shipping destination. When the shipping server 60 receives this shipping command, staff at the supplier begin performing shipping duties including packaging and shipping the articles.

This completes the process according to the first embodiment executed by the devices 10-60.

1-3. Effects of the First Embodiment

The first embodiment described above in detail obtains the following effects.

(1) In the present embodiment, the management server 30 receives purchasing information from the information processing device 10 that specifies the articles and the shipping destination for the articles (S107). At this time, the management server 30 executes a specific process for generating a start-up URL for starting up the target application TA. The specific process in this case is a process enabling, causing, or triggering generation of the start-up URL, i.e., a process generating a purchasing ID and transmitting the purchasing ID to the information processing device 10 (S112 and S114). After the management server 30 executes the specific process, the information processing device 10 uses the purchasing ID to generate the start-up URL (S115). Subsequently, the information processing device 10 transmits the start-up URL to the external device 20, and the external device 20 starts up the target application TA based on the start-up URL transmitted from the information processing device 10. Once payment has been concluded using the target application TA, the management server 30 receives the purchase completion notification from the external device 20 (S129). Upon receiving the purchase completion notification from the external device 20, the management server 30 transmits the shipping command to the shipping server 60 instructing the shipping server 60 to ship the articles to the shipping destination specified in the purchasing information (S133).

Therefore, when the purchase client using the information processing device 10 requests the purchaser using the external device 20 to purchase the articles, the purchaser can purchase the articles to arrange for delivery of the articles without knowing information on the shipping destination. Hence, there is no need for the purchase client to communicate the shipping destination to the purchaser nor for the purchaser to communicate the shipping destination to the supplier. Accordingly, this configuration reduces the time and effort required for users such as the purchase client or the purchaser, enhancing convenience for these users.

(2) In the present embodiment, a printer-related consumable is envisioned as one of the article being purchased. Hence, this embodiment reduces the time and effort required by users such as the purchase client or the purchaser and enhances convenience for these users when one user requests another to purchase a printer-related consumable.

(3) In the present embodiment, the management server 30 receives authentication information from the information processing device 10 (S103). Subsequently, the management server 30 authenticates the user of the information processing device 10 using the received authentication information (S104). When authentication is successful, the information processing device 10 generates the start-up URL (S115).

Therefore, when user authentication is successful for the user of the information processing device 10, and specifically the purchase client, the information processing device 10 can generate the start-up URL and, hence, payment can be concluded using the target application TA. Accordingly, the purchaser who is requested to make the purchase can complete payment with more confidence.

(4) The target application TA in the present embodiment is an application that does not require installation. Therefore, once the need for using the target application TA has passed, such as when the cost of articles has been paid, the target application TA is automatically deleted from the external device 20. Accordingly, the present embodiment can avoid the target application TA remaining on the external device 20 once the target application TA is no longer needed.

(5) In the present embodiment, the target application TA is an application that provides some functions of the application AR Hence, the target application TA can be used to make a payment without having to install the full application, i.e., the application AP. Accordingly, payment can be completed more quickly than in a conceivable case that the user installs the application AP to make the payment.

(6) In the present embodiment, the management server 30 generates a purchasing ID upon receiving purchasing information from the information processing device 10 (S112). This purchasing ID is included in the start-up URL for starting up the target application TA.

Therefore, the purchasing ID is inputted into the target application in advance when the target application TA is started up using the start-up URL. Accordingly, the purchaser using the external device 20 need not input the purchasing ID for purchasing (making a payment on) articles, thereby enhancing convenience for the purchaser.

(7) In the present embodiment, the management server 30 receives from the external device 20 the purchasing ID that is transmitted according to the process executed by the target application TA when payment is completed (S129). The management server 30 retrieves the shipping destination associated with the purchasing ID (S130). Subsequently, the management server 30 transmits the shipping command to the shipping server 60 for shipping the articles to the retrieved shipping destination (S133).

Hence, the articles are shipped to the designated shipping destination without the purchaser having to input the shipping destination for the articles being purchased, thereby enhancing convenience for the user.

(8) In the present embodiment, the management server 30 receives from the external device 20 the purchasing ID transmitted through the process executed by the target application TA (S120) before payment has been completed for the articles whose purchase was requested. Subsequently, the management server 30 transmits the purchase payment information to the external device 20 including information on the articles associated with the purchasing ID (S121).

Hence, the external device 20 can use the purchase payment information received from the management server 30 to display the purchase confirmation screen B1, for example. Accordingly, the purchaser can make a payment upon verifying the details of the purchase.

In the present embodiment, the purchasing information corresponds to the specification information, the target application TA corresponds to the application software for paying charges, and the application AP corresponds to the main application. Additionally, the purchase completion notification corresponds to the payment complete information, the purchasing ID corresponds to the purchase identification information, the payment ID corresponds to the payment ID identification information, and the payment registration information corresponds to the information on the article specified by the specification information. Further, S103 corresponds to the process of the authentication reception, S104 corresponds to the process of the authentication, S107 corresponds to the process of the specification reception, and S112 and S114 correspond to the process of the identification execution. Further, S112 corresponds to the process of the identification generation, S115 corresponds to the process of the URL generation, S120 corresponds to the process of the pre-payment reception, S121 corresponds to the process of the transmission to the target device, and S129 corresponds to the process of the completion reception. Further, S129 corresponds to the process of the post-payment reception, S130 corresponds to the process of the retrieval, and S133 corresponds to the process of commanding shipping.

2. Second Embodiment

2-1. Differences from the First Embodiment

Next, a second embodiment of the present disclosure will be described. Since the basic structures in the second embodiment are identical to those in the first embodiment, only the differences will be described below. Note that steps and components identical to those in the first embodiment are designated with the same step numbers and reference numerals for referencing prior descriptions.

In the first embodiment described above, the external device 20 receives the purchase payment information from the management server 30 (S121) . The purchase payment information is used when displaying the purchase confirmation screen Bi and the payment confirmation screen B2 on the display 22. The second embodiment differs from the first embodiment in that the external device 20 receives the purchase payment information from the electronic payment server 40 rather than the management server 30. Below, the second embodiment will be described in detail. Note that the hardware configuration of the system 1 in the second embodiment is identical to that in the first embodiment.

2-2. Process

Next, a process executed by devices 10-60 in the second embodiment in place of the process described in the first embodiment (see FIGS. 2 and 3) will be described with reference to FIGS. 6 and 7.

Figure 6:
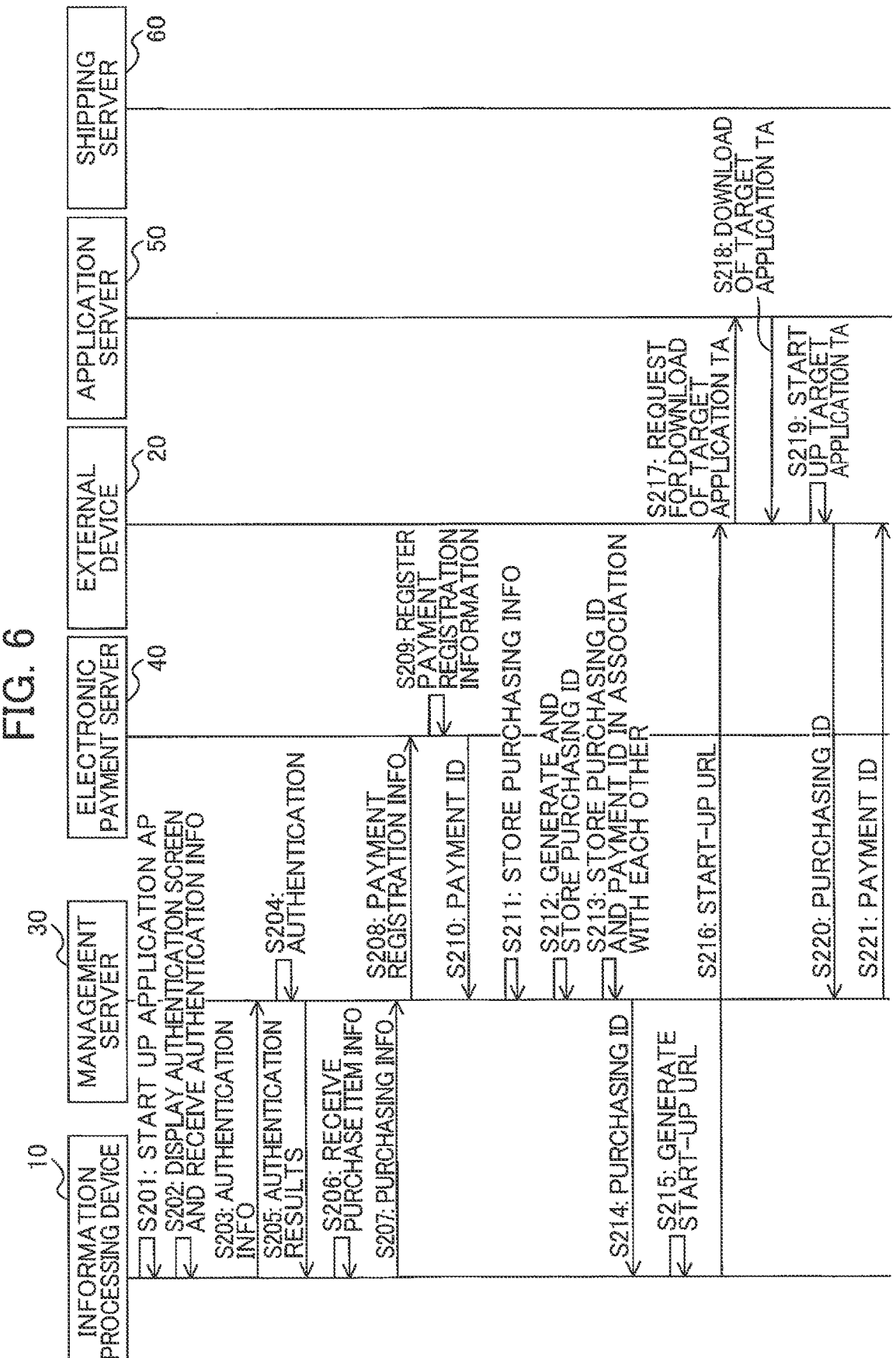
FIG. 6 is a sequence diagram illustrating a part of a process performed by the system.

Steps S201-S207 in FIG. 6 are identical to steps S101-S107 in FIG. 2 described above and, hence, a description of these steps will not be repeated here. In S208 the management server 30 transmits payment registration information to the electronic payment server 40. The payment registration information in the second embodiment includes information specifying a name of each electronic item, a total cost, and the like of the set of electronic items, as in the first embodiment. Here the name of the electronic item in the second embodiment includes an actual name, a model number, and a quantity of each article being purchased. Further, in addition to the above information, the payment registration information in the second embodiment includes the client account name, the shipping destination for the articles, contact information for the purchase client, and the like. In S209 the electronic payment server 40 uses the payment registration information received in S208 to register the articles being purchased in the storage thereof (not shown) as a set of electronic items. Further, the electronic payment server 40 also registers the name and total cost of the set of electronic items, the client account name, the shipping destination for the articles, contact information for the purchase client.

Steps S210-S220 in FIG. 6 are identical to steps S110-S120 in FIG. 2 described above and, hence, a description of these steps will not be repeated here. In S221 the management server 30 acquires the payment ID stored in the storage 33 in association with the purchasing ID received from the external device 20 in S220. The management server 30 transmits the payment ID acquired from the storage 33 to the external device 20.

Figure 7:
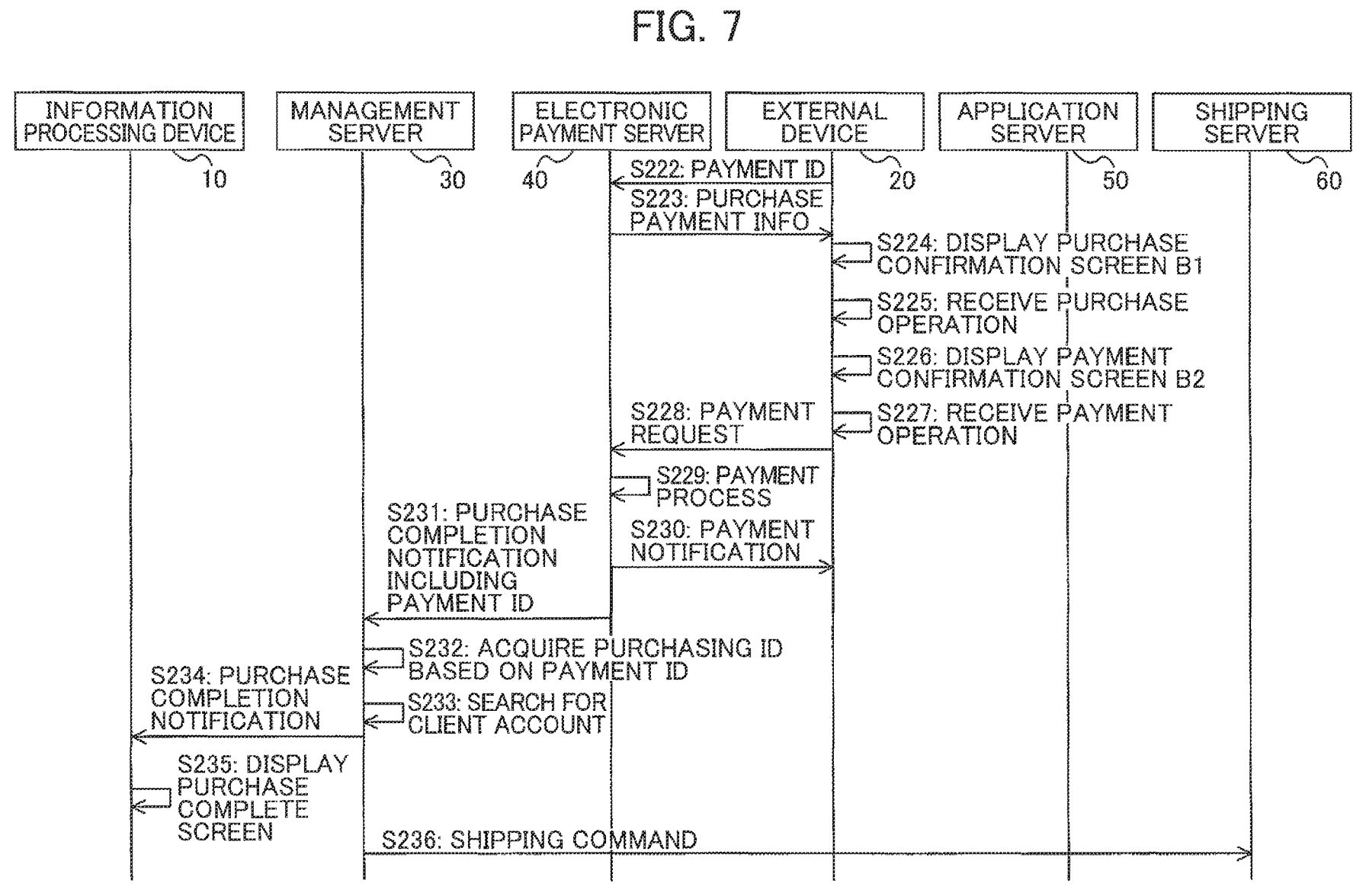

In S222 of FIG. 7, the target application TA on the external device 20 transmits the payment ID received in S221 to the electronic payment server 40. In S223 the electronic payment server 40 transmits purchase payment information to the external device 20.

Specifically, the electronic payment server 40 references the set of electronic items associated with the payment ID that was received in S222. Next, the electronic payment server 40 transmits the name and total cost of the set of electronic items, the client account name, the shipping destination for the articles, contact information for the purchase client, and the like to the external device 20. In the present embodiment, the name of each electronic item includes the name, the model number, and the quantity of the corresponding actual article being purchased. Accordingly, the information transmitted to the external device 20 in S223 is identical in content to the purchase payment information that the management server 30 transmits to the external device 20 in S121 of FIG. 2 according to the first embodiment. The purchase payment information received in S223 is used in the second embodiment instead of the purchase payment information received in S121 of the first embodiment.

Steps S224-S230 in FIG. 7 are identical to steps S122-S128 in FIG. 2 described above and, hence, a description of these steps will not be repeated here. In S231 the electronic payment server 40 transmits a purchase completion notification that includes the payment ID to the management server 30. Thus, while the external device 20 transmits the purchase completion notification to the management server 30 in S129 of the first embodiment, the electronic payment server 40 transmits the purchase completion notification to the management server 30 in the second embodiment.

In S232 the management server 30 acquires the corresponding purchasing ID from the storage 33 based on the payment ID received in S231. Steps S233-S236 in FIG. 7 are identical to steps S130-S133 in FIG. 3 described above and, hence, a description of these steps will not be repeated here. This completes the process according to the second embodiment executed by the devices 10-60.

2-3. Effects of the Second Embodiment

The second embodiment described above in detail obtains the effects the same as the above-described effects (1)-(6) of the first embodiment, and the following effects.

(1) In the second embodiment, the management server 30 stores the payment ID, which is received from the electronic payment server 40, in association with the purchasing ID (S213). Thereafter, the management server 30 receives a purchase completion notification that includes the payment ID from the electronic payment server 40 (S231). Next, the management server 30 acquires from the storage 33 the purchasing ID that is associated with the payment ID received from the electronic payment server 40 (S232). The management server 30 retrieves the shipping destination associated with the purchasing ID (S233). Next, the management server 30 transmits a shipping request to the shipping server 60 requesting that the supplier ships the articles to the retrieved shipping destination (S236).

Hence, the articles can be shipped to the specified shipping destination without requiring the purchaser using the external device 20 to input the shipping destination for the articles. Accordingly, this method can enhance convenience for the purchaser.

(2) When the management server 30 receives the purchasing information from the information processing device 10 in the second embodiment, the management server 30 transmits the payment registration information to the electronic payment server 40 that includes information on the articles specified in the purchasing information (S208).

Therefore, by acquiring the purchase payment information from the electronic payment server 40 that includes information on the articles, the external device 20 can display the purchase confirmation screen BI including information on the articles on the display 22. Accordingly, the purchaser can make a payment after confirming details of the purchase.

In the second embodiment, S203 corresponds to a process of the authentication reception, S204 corresponds to a process of the authentication, and S207 corresponds to a process of the designation reception. Further, S208 corresponds to a process of the server-directed transmission, S212 and S214 correspond to a process of the specific process execution, S212 corresponds to a process of the identification information generation, S213 corresponds to a process of the storage, and S215 corresponds to a process of the URL generation. Further, S231 corresponds to a process of the completion reception and the payment reception, S232 corresponds to a process of the identification information acquisition, S233 corresponds to a process of the retrieval, and S236 corresponds to a process of the commanding shipping.

While the disclosure has been described in detail with reference to the specific embodiment thereof, it would be apparent to those skilled in the art that various changes and modifications may be made therein without departing from the scope of the invention.

(1) While a printer-related consumable is given as an example of the article being purchased in the embodiments described above, the article being purchased is not limited to printer-related consumables. For example, the article may be a consumable other than a printer-related consumable. Further, the article may be an article other than a consumable, for example. In this case, the article being purchased may be an apparatus that uses consumables (a printer, for example).

(2) in the embodiments described above, the information processing device 10 generates a start-up URL for starting up the target application TA, but the device generating the start-up URL is not limited to the information processing device 10. For example, the management server 30 may generate a start-up URL and may transmit this start-up URL to the information processing device 10, In this case, the process by which the management server 30 generates the start-up URL, corresponds to the specific process for generating a URL.

(3) In the embodiments described above, the purchasing information is transmitted to the management server 30 via the application AP on the information processing device 10 in steps S107 and S207, but the method of transmitting purchasing information to the management server 30 is not limited to this method. For example, by accessing a prescribed web page with the information processing device 10, the purchase client may input information on the articles and the like in the web page to transmit purchasing information to the management server 30.

When the information processing device 10 is a printer, for example, the purchase client may input information on the articles to be purchased through operations on the operation interface of the printer, and the printer (i.e., the information processing device 10) may transmit purchasing information to the management server 30.

(4) In the embodiments described above, the application AP need not be the main application of the target application TA (i.e., the App Clip). In this case, an application other than the application AP may be the main application of the target application TA.

(5) In the embodiments described above, an App Clip developed by Apple Inc. is used as an example of the target application TA, but the target application TA in the present disclosure is not limited to an App Clip. For example, the target application TA may be a Google Instant app or the like. Alternatively rather than an application that does not require installation such as App Clips and Instant apps, the target application TA may be an application requiring installation (the regular complete application, for example).

(6) In the first embodiment described above, the external device 20 transmits the purchase completion notification to the management server 30 in S129, but the electronic payment server 40 may transmit the purchase completion notification to the management server 30 instead. Further, in S231 of the second embodiment, the electronic payment server 40 transmits the purchase completion notification to the management server 30, but the external device 20 may transmit the purchase completion notification to the management server 30 instead.

(7) In the embodiments described above, the contact information displayed in the payment confirmation screen B2 is envisioned to be information specifying a contact address for the purchase client, but the contact information displayed in the payment confirmation screen 132 is not limited to this. For example, information specifying the contact address for the contact point of the company supplying the purchase requesting service may be displayed as the contact information.

(8) Each of controllers 14, 25, and 32 and their methods described in this specification may be implemented by a dedicated computer configured of memory and a processor that has been programmed to execute one or a plurality of the functions realized by a computer program. Alternatively, each of the controllers 14, 25, and 32 and their methods in the present specification may be implemented by a dedicated computer having a processor configured of one or more dedicated hardware logic circuits. Alternatively, each of the controllers 14, 25, and 32 and their methods described in the present specification may be implemented by one or more dedicated computers having a combination of memory and a processor programmed to implement one or a plurality of the functions, and a processor configured of one or more hardware logic circuits. The computer program may be stored in a computer-readable non-transitory, tangible storage medium as instructions executed by the computer.

(9) A plurality of functions implemented by one component in the above embodiments may be implemented by a plurality of components. One function implemented by one component may be implemented by a plurality of components. A plurality of functions implemented by a plurality of components may be implemented by one component. One function implemented by a plurality of components may be implemented by one component. A part of components in the embodiments may be omitted. At least part of components in one embodiment may be added to the configuration of another embodiment, or replaced with at least part of components of another embodiment.

(10) In addition to the controllers 14, 25, and 32 described above, the present specification can be implemented in various ways using the system configured of the controllers 14, 25, and 32 as components; the program controlling a computer to function as the controllers 14, 25, and 32; the semiconductor memory or other non-transitory, tangible storage medium storing this program; the method for requesting another party to purchase articles and for paying the cost of the articles; and the like.

What is claimed is:

1. A non-transitory computer readable storage medium storing a set of program instructions installed on and executed by a computer provided in a management server installed on a network by a company providing a purchase requesting service, the set of program instructions executed by the computer causing the management server to perform:

receiving authentication information from a first information processing device, wherein the authentication information includes a user ID;

performing user authentication based on the authentication information received from the first information processing device;

when the user authentication is successful, receiving designation information as a request to purchase an article from the first information processing device, wherein the designation information designates the article to be purchased and a shipping destination of the article;

when the user authentication is successful and the designation information is received from the first information processing device, transmitting a request to an electronic payment server, wherein the request requests the electronic payment server to register information on the article to make an electronic payment of a charge for the article;

when the request is transmitted, receiving payment identification information from the electronic payment server that is different from the management server and is installed on the network by a company providing an electronic payment service, wherein the payment identification information is used by the electronic payment server to receive the electronic payment of the charge for the article;

generating purchasing identification information;

storing, in a memory, the purchasing identification information in association with both the article and the shipping destination which are designated by the designation information;

storing, in the memory, the purchasing identification information and the payment identification information in association with each other;

when the user authentication is successful and the designation information is received from the first information processing device, sending the generated purchasing identification information to the first information processing device without sending the payment identification information, wherein the purchasing identification information is used by the first information processing device to generate a Uniform Resource Locator (URL), wherein the first information processing device is configured to transmit the URL to a second information processing device that is different from the first information processing device, wherein the URL includes the purchasing identification information and information for starting up a specific application software to pay the charge for the article designated by the designation information, wherein the specific application software is started and executed by the second information processing device without requiring installation and is automatically removed from hardware of the second information processing device once a prescribed time has elapsed;

receiving the purchasing identification information from the specific application software that has been started and executed on the second information processing device in response to receiving the URL;

when the purchasing identification information is received from the specific application software executed on the second information processing device, sending the payment identification information that has been stored in the memory in association with the purchasing identification information to the second information processing device, wherein the second information processing device is configured to send payment authorization to the electronic payment server to complete the electronic payment of the charge using the specific application software and the purchasing identification information, and send purchase completion information including the purchasing identification information after completing the electronic payment of the charge, wherein the purchase completion information indicates that the electronic payment is completed;

receiving the purchase completion information including the purchasing identification information that has been sent from the second information processing device in response to completing the electronic payment of the charge using the specific application software and the purchasing identification information; and in response to receiving the purchase completion information including the purchasing identification information, transmitting, to the shipping destination, a shipping command to ship the article that has been stored in the memory in association with the purchasing identification information and is designated by the designation information.

2. The non-transitory computer readable storage medium according to claim 1, wherein the article includes at least one of a consumable and a device using the consumable.

3. The non-transitory computer readable storage medium according to claim 1, wherein the specific application software is related to a main application software such that one or more parts of functions of the main application software are provided to the specific application software.

4. The non-transitory computer readable storage medium according to claim 1, wherein the specific application software is a software in a form of an App Clip or an Instant App.

5. The non-transitory computer readable storage medium according to claim 1, wherein the set of program instructions executed by the computer causes the management server to further perform:

receiving the purchasing identification information which is transmitted from the specific application software running on the second information processing device when the electronic payment is completed; and retrieving the shipping destination which is stored in the memory in association with the purchasing identification information received from the second information processing device, wherein the shipping command is a command to ship the article to the retrieved shipping destination.

6. The non-transitory computer readable storage medium according to claim 1, wherein the set of program instructions executed by the computer causes the management server to further perform:

receiving the payment identification information identifying the electronic payment of the charge for the article from the electronic payment server;

acquiring the purchasing identification information which has been stored in the memory in association with the received payment identification information; and retrieving the shipping destination which has been stored in the memory in association with the acquired purchasing identification information, wherein the shipping command is a command to ship the article to the retrieved shipping destination.

7. The non-transitory computer readable storage medium according to claim 1, wherein the purchasing identification information is received from the specific application software executed on the second information processing device before the electronic payment of the charge for the article is completed; and wherein the information on the article which has been stored in the memory in association with the received purchasing identification information is sent together with the payment identification information.

8. The non-transitory computer readable storage medium according to claim 1, wherein the set of program instructions executed by the computer causes the management server to further perform:

transmitting the information on the article designated in the designation information to the electronic payment server when the designation information is received, wherein the electronic payment server is configured to receive the electronic payment of the charge for the article.

9. The non-transitory computer readable storage medium according to claim 1, wherein the payment identification information is used for identifying the electronic payment of the charge for the article which is designated by the designation information and the payment identification information is used by the electronic payment server to receive the electronic payment of the charge for the article.

10. The non-transitory computer readable storage medium according to claim 1, wherein the set of program instructions executed by the computer causes the management server to further perform:

transmitting payment registration information to the electronic payment server, wherein the payment registration information is based on the designation information; and wherein the payment identification information is received from the electronic payment server as a response to the payment registration information, and wherein the payment identification information, which has been stored in the memory in association with the received purchasing identification information, is sent to the second information processing device being configured to send the payment identification information to the electronic payment server for requesting completion of the electronic payment.

11. The non-transitory computer readable storage medium according to claim 1, wherein the set of program instructions executed by the computer causes the management server to further perform:

generating the URL includes the purchasing identification information as a URL query parameter, wherein the URL specifies a location to download the specific application software;

sending, to the first information processing device, the URL that includes the purchasing identification information.

12. A system for providing a purchasing requesting service over a network, the system comprising:

one or more computers as a whole configured to perform:

receiving authentication information from a first information processing device, wherein the authentication information includes a user ID;

performing user authentication based on the authentication information received from the first information processing device;

when the user authentication is successful, receiving designation information as a request to purchase an article from the first information processing device, wherein the designation information designates the article to be purchased and a shipping destination of the article;

when the user authentication is successful and the designation information is received from the first information processing device, transmitting a request to an electronic payment server, wherein the request requests the electronic payment server to register information on the article to make an electronic payment of a charge for the article;

when the request is transmitted, receiving payment identification information from the electronic payment server that is different from the management server and is installed on the network by a company providing an electronic payment service, wherein the payment identification information is used by the electronic payment server to receive the electronic payment of the charge for the article;

generating purchasing identification information;

storing, in a memory, the purchasing identification information in association with both the article and the shipping destination which are designated by the designation information;

storing, in the memory, the purchasing identification information and the payment identification information in association with each other;

when the user authentication is successful and the designation information is received from the first information processing device, sending the generated purchasing identification information to the first information processing device without sending the payment identification information, wherein the purchasing identification information is used by the first information processing device to generate a Uniform Resource Locator (URL), wherein the first information processing device is configured to transmit the URL to a second information processing device that is different from the first information processing device, wherein the URL includes the purchasing identification information and information for starting up a specific application software to pay the charge for the article designated by the designation information, wherein the specific application software is started and executed by the second information processing device without requiring installation and is automatically removed from hardware of the second information processing device once a prescribed time has elapsed;

receiving the purchasing identification information from the specific application software that has been started and executed on the second information processing device in response to receiving the URL;

when the purchasing identification information is received from the specific application software executed on the second information processing device, sending the payment identification information that has been stored in the memory in association with the purchasing identification information to the second information processing device, wherein the second information processing device is configured to send payment authorization to the electronic payment server to complete the electronic payment of the charge using the specific application software and the purchasing identification information;

send purchase completion information including the purchasing identification information after completing the electronic payment of the charge, wherein the purchase completion information indicates that the electronic payment is completed;

receiving the purchase completion information including the purchasing identification information that has been sent from the second information processing device in response to completing the electronic payment of the charge using the specific application software and the purchasing identification information; and in response to receiving the purchase completion information including the purchasing identification information, transmitting, to the shipping destination, a shipping command to ship the article that has been stored in the memory in association with the purchasing identification information and is designated by the designation information.

* * * * *